(12) United States Patent
Mlinar

(10) Patent No.: US 6,749,713 B2
(45) Date of Patent: Jun. 15, 2004

(54) APPARATUS AND METHOD FOR SEPARATING A FUEL CELL ASSEMBLY FROM A BONDING FIXTURE

(75) Inventor: John Russell Mlinar, Coon Rapids, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 181 days.

(21) Appl. No.: 10/115,731

(22) Filed: Apr. 3, 2002

(65) Prior Publication Data

US 2003/0188418 A1 Oct. 9, 2003

(51) Int. Cl.[7] ................................. B32B 35/00
(52) U.S. Cl. .................. 156/344; 156/584; 29/239; 29/426.5; 29/763
(58) Field of Search ................. 156/344, 584; 29/762, 763, 426.5, 239

(56) References Cited

U.S. PATENT DOCUMENTS

| | | |
|---|---|---|
| 2,710,234 A | 6/1955 | Hansen |
| 3,178,041 A | 4/1965 | Wheat et al. |
| 3,285,112 A | 11/1966 | Dale et al. |
| 3,359,046 A | 12/1967 | Dryden |
| 3,380,788 A | 4/1968 | Wilcock |
| 3,477,558 A | 11/1969 | Fleischauer |
| 3,861,259 A | 1/1975 | Hitch |
| 3,946,920 A | 3/1976 | Jordan et al. |
| 4,143,871 A | 3/1979 | Blessing |
| 4,168,772 A | 9/1979 | Eberle |
| 4,236,814 A | 12/1980 | Tonkin |
| 4,286,467 A | 9/1981 | Kober |
| 4,360,260 A | 11/1982 | Eloranta et al. |
| 4,381,596 A | 5/1983 | Simonton et al. |
| 4,534,549 A | 8/1985 | Eberle |

(List continued on next page.)

FOREIGN PATENT DOCUMENTS

| | | |
|---|---|---|
| AT | 314 323 B | 3/1974 |
| BE | 1007774 A3 | 10/1995 |
| DE | 19 28 110 A | 12/1970 |
| DE | 26 10 628 A | 9/1977 |
| DE | 33 43 811 A | 6/1985 |
| DE | 94 00 890.6 U1 | 3/1994 |
| EP | 0 654 347 A1 | 11/1994 |
| FR | 2 456 613 A | 12/1980 |
| GB | 1 084 597 A | 9/1967 |
| GB | 2101098 A | 1/1983 |

(List continued on next page.)

OTHER PUBLICATIONS

U.S. patent application Ser. No. 10/446,485, filed May 28, 2003, Roll–Good Fuel Cell Fabrication Processess, Equipment, and Articles Produced From Same.

(List continued on next page.)

*Primary Examiner*—Mark A. Osele
(74) *Attorney, Agent, or Firm*—Mark A. Hollingsworth; Philip Y. Dahl

(57) ABSTRACT

A method and apparatus for separating a membrane electrode assembly (MEA) from a fixture assembly subsequent to MEA bonding within the fixture assembly involves stabilizing the first fixture of the fixture assembly. The second fixture of the fixture assembly is stabilized. While the second fixture is stabilized, the first fixture is pressurized to cause the first surface of the MEA to separate from the first fixture. While the first fixture is stabilized, the second fixture is pressurized to cause the second surface of the MEA to separate from the second fixture. The second fixture is then moved out of proximity with the first fixture to permit removal of the MEA from the first fixture.

30 Claims, 4 Drawing Sheets

U.S. PATENT DOCUMENTS

| | | | |
|---|---|---|---|
| 4,591,139 A | | 5/1986 | Engelbart |
| 4,676,862 A | | 6/1987 | Kuchnert |
| 4,728,093 A | | 3/1988 | Eberle |
| 4,784,380 A | | 11/1988 | Eberle |
| 4,819,928 A | | 4/1989 | Osborn et al. |
| 4,887,858 A | | 12/1989 | Gazzarrini |
| 5,000,697 A | * | 3/1991 | Murphy .................. 439/331 |
| 5,031,002 A | | 7/1991 | Yaguchi |
| 5,048,182 A | | 9/1991 | Robbins, III |
| 5,061,337 A | | 10/1991 | Fraser |
| 5,063,415 A | | 11/1991 | Ariyama |
| 5,078,375 A | | 1/1992 | Steidinger |
| 5,133,543 A | | 7/1992 | Eitel et al. |
| 5,456,871 A | | 10/1995 | Harada et al. |
| 5,556,499 A | | 9/1996 | Clough |
| 5,596,897 A | | 1/1997 | Payne, Jr. et al. |
| 5,762,753 A | | 6/1998 | Clough |
| 5,783,024 A | | 7/1998 | Forkert |
| 5,791,185 A | | 8/1998 | Bodnar |
| 5,989,747 A | | 11/1999 | Tanaka et al. |
| 6,007,660 A | | 12/1999 | Forkert |
| 6,059,003 A | | 5/2000 | Wittkopf |
| 6,066,409 A | | 5/2000 | Ronne et al. |
| 6,159,327 A | | 12/2000 | Forkert |
| 6,224,203 B1 | | 5/2001 | Wotton |
| 6,241,839 B1 | | 6/2001 | Yoshino et al. |
| 6,347,585 B1 | | 2/2002 | Kiamco et al. |
| 6,405,779 B1 | | 6/2002 | Wittkopf |
| 6,419,217 B1 | | 7/2002 | Hartmann et al. |
| 6,470,946 B2 | * | 10/2002 | De .......................... 156/584 |
| 6,554,949 B2 | * | 4/2003 | De et al. ................... 156/344 |
| 6,627,037 B1 | * | 9/2003 | Kurokawa et al. .......... 156/344 |
| 2002/0014509 A1 | | 2/2002 | Kitai et al. |

FOREIGN PATENT DOCUMENTS

| | | |
|---|---|---|
| JP | 55-98040 | 7/1980 |
| JP | 57-93854 | 6/1982 |
| JP | 62-244830 | 10/1987 |
| JP | 403-128851 | 5/1991 |
| JP | 403-128853 | 5/1991 |
| JP | 96335462 A | 12/1996 |
| JP | 10-166014 | 6/1998 |
| JP | 11 273663 A | 10/1999 |
| JP | 11 297314 A | 10/1999 |
| JP | 99292327 A | 10/1999 |

OTHER PUBLICATIONS

U.S. patent application Ser. No. 10/115,516, Mlinar et al., filed Apr. 3, 2002, co–pending application.

U.S. patent application Ser. No. 10/115,733, Mlinar, filed Apr. 3, 2002, co–pending application.

U.S. patent application Ser. No. 10/115,556, Eaton et al., filed Apr. 3, 2002, co–pending application.

U.S. patent application Ser. No. 10/115,537, Schukar et al., filed Apr. 3, 2002, co–pending application.

U.S. patent application Ser. No. 10/115,513, Behymer, filed Apr. 3, 2002, co–pending application.

U.S. patent application Ser. No. 10/115,778, Hirsch, filed Apr. 3, 2002, co–pending application.

U.S. patent application Ser. No. 10/115,777, Ripley, filed Apr. 3, 2002, co–pending application.

U.S. patent application Ser. No. 10/116,323, Ripley, filed Apr. 3, 2002, co–pending application.

U.S. patent application Ser. No. 10/115,523, Ripley et al., filed Apr. 3, 2002, co–pending application.

* cited by examiner

APPARATUS AND METHOD FOR SEPARATING A FUEL CELL ASSEMBLY FROM A BONDING FIXTURE

FIELD OF THE INVENTION

The present invention relates generally to fuel cell bonding and, more particularly, to an apparatus and method for separating a membrane electrode assembly (MEA) from a bonding fixture during automated fuel cell assembly.

BACKGROUND OF THE INVENTION

A variety of techniques have been developed for laminating stacks of thin layers of materials, such as fuel cell layers. Conventional lamination approaches, for example, often involve subjecting a stack of thin material layers to pressure and heat, such as by use of a bonding press. It is often desirable to automate, either partially or completely, a number of stack processing operations, including stacking, bonding, and cutting operations, for example. Many conventional material stacking, bonding, and cutting apparatuses are not well suited for achieving a high level of automation. This is particularly the case for automated processes which have tight positional tolerance requirements at all stages of processing.

In the case of automated bonding and cutting of a stack of thin material layers, for example, it is necessary to maintain positional continuity of the stack as the stack is processed and moved from the bonding station to the cutting station. This requirement for positional predictability significantly complicates the objective of automating the stack bonding and cutting processes.

There is a need for improved material layer bonding apparatuses and fixtures. There is a further need for an improved apparatus and method for automatically extracting a stack assembly subsequent to a bonding or curing cycle. The present invention fulfills these and other needs.

SUMMARY OF THE INVENTION

The present invention is directed to an apparatus and method for separating a membrane electrode assembly (MEA) from a fixture assembly subsequent to MEA bonding within the fixture assembly. The fixture assembly includes a first fixture that contacts a first surface of the MEA and a second fixture that contacts a second surface of the MEA. The first and second fixtures include substantially porous regions, respectively.

The separation apparatus includes a base comprising a first port. The base is adapted to receive the fixture assembly, such that the first port is in fluid communication with a first surface of the MEA via the porous region of the first fixture.

The separation apparatus further includes a gripper assembly mounted for movement on a support. The gripper assembly includes a gripper mechanism and a second port. The second port is in fluid communication with a second surface of the MEA via the porous region of the second fixture. The first and second ports are selectively pressurized and evacuated to separate the first and second surfaces of the MEA from the first and second fixtures, respectively. The gripper assembly is adapted to releasably grip a pair of opposing edges of the second fixture and to move the second fixture out of proximity with the first fixture.

In accordance with a method of separating a membrane electrode assembly from a fixture assembly subsequent to MEA bonding within the fixture assembly, the first fixture of the fixture assembly is initially stabilized. The second fixture of the fixture assembly is stabilized. While the second fixture is stabilized, the first fixture is pressurized to cause the first surface of the MEA to separate from the first fixture. While the first fixture is stabilized, the second fixture is pressurized to cause the second surface of the MEA to separate from the second fixture. According to one particular approach, a vacuum is applied to the second fixture and second surface of the MEA while pressure is being applied to the first fixture and first surface of the MEA, and, subsequently, vacuum is applied to the first fixture and first surface of the MEA while pressure is being applied to the second fixture and second surface of the MEA. The second fixture is then moved out of proximity with the first fixture to permit removal of the MEA from the first fixture.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
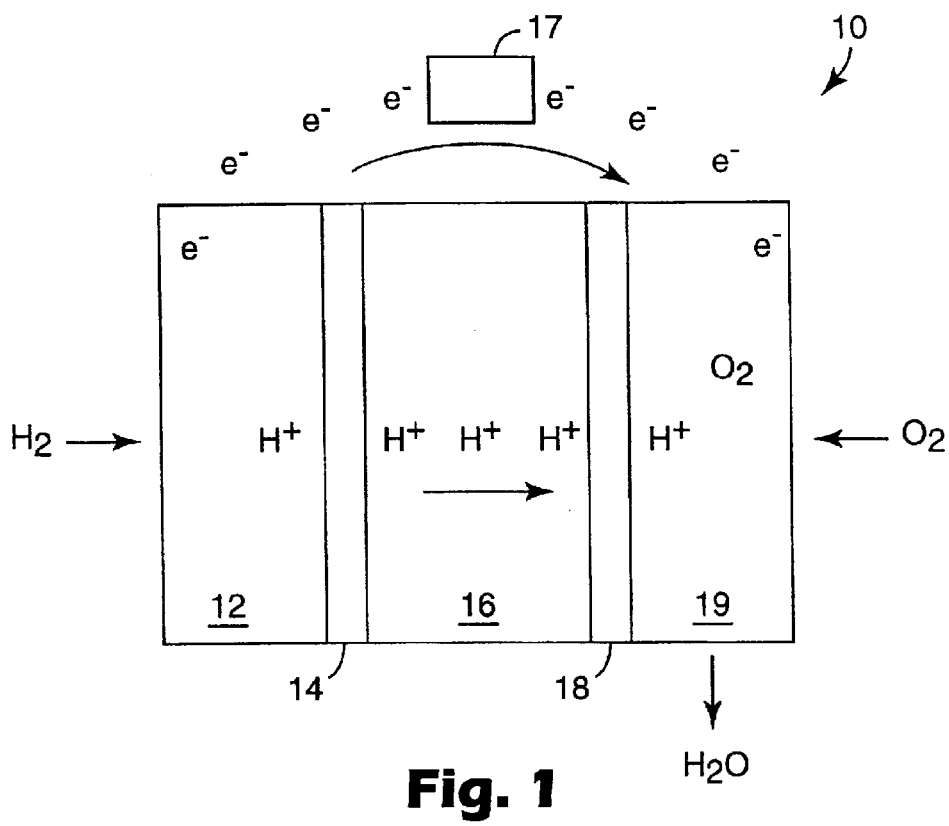
FIG. 1 is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

A separation apparatus of the present invention facilitates automated separation of a fuel cell assembly from a bonding fixture (e.g., fixture pallet assembly) following a bonding process. A separation apparatus of the present invention employs an automated gripper assembly and selective use of air pressure and vacuum to separate a membrane electrode assembly from a fixture pallet assembly within which the MEA was bonded.

In accordance with an automated process for assembling fuel cells, a series of process stations are employed in assembly line fashion to stack, bond, and cut fuel cell MEAs without human intervention. It can be appreciated that maintaining a predetermined orientation of the MEA at each process station is essential if processing of the MEA with high efficiency and accuracy is to be achieved. Disrupting the positioning of the MEA at a particular process station can result in damage to the MEA or reduced throughput at the particular process station, which negatively affects the productivity of the automated fuel cell assembly line.

After stacking fuel cell material layers (e.g., MEA layers) in a fixture pallet assembly and bonding/curing the MEA within the pallet assembly using bonding/curing presses, the MEA needs to be removed from the fixture pallet assembly. In addition, the position of the MEA must be maintained so that the MEA can be properly processed at a downstream cutting station. A loss of proper MEA position during the fixture pallet/MEA separation phase would result in the MEA being cut at the wrong position when processed at the cutting station, thereby resulting in damage to the MEA. A separation apparatus of the present invention provides for the preservation of proper MEA position when separating the MEA from the fixture pallet assembly.

In some MEA configurations, a gasket is molded around the MEA during the bonding cycle. This gasket can be made from most any material, but is typically formed from a two-part silicone. Though the pallet fixture assembly plates are typically coated with a release agent, there is generally some slight adhesion that results between the gasket material and the fixture pallet assembly plates. A separation apparatus of the present invention advantageously provides for safe separation of the MEA and gasket from the fixture pallet assembly while maintaining proper positioning of the MEA and gasket subsequent to separation with the fixture pallet assembly.

A separation apparatus of the present invention may be used in conjunction with a wide variety of bonding/curing fixtures and fuel cell technologies. A typical fuel cell is depicted in FIG. 1. The fuel cell 10 shown in FIG. 1 includes a first fluid transport layer 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

A separation apparatus of the present invention can be employed to facilitate automated separation of fuel cells of varying technologies from fuel cell bonding/curing fixtures. Proton exchange membrane (PEM) fuel cells, for example, operate at relatively low temperatures (about 175 degrees F.), have high power density, can vary their output quickly to meet shifts in power demand, and are well suited for applications where quick startup is required, such as in automobiles for example.

The proton exchange membrane used in a PEM fuel cell is a thin plastic sheet that allows hydrogen ions to pass through it. The membrane is coated on both sides with highly dispersed metal or metal alloy particles (e.g., platinum or platinum/ruthenium) that are active catalysts. The electrolyte used is typically a solid organic polymer polyperfluorosulfonic acid. Use of a solid electrolyte is advantageous because it reduces corrosion and management problems.

Hydrogen is fed to the anode side of the fuel cell where the catalyst encourages the hydrogen ions to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

According to one PEM fuel cell construction, a PEM layer is sandwiched between a pair of fluid transport layers (FTLs), such as diffuse current collectors or gas diffusion layers for example. An anode is situated between a first FTL and the membrane, and a cathode is situated between the membrane and a second FTL. In one configuration, a PEM layer is fabricated to include an anode catalyst coating on one surface and a cathode catalyst coating on the other surface. According to another configuration, the first and second FTLs are fabricated to include an anode and cathode catalyst coating, respectively. In yet another configuration, an anode catalyst coating can be disposed partially on the first FTL and partially on one surface of the PEM, and a cathode catalyst coating can be disposed partially on the second FTL and partially on the other surface of the PEM. The five layer construct defined by the first FTL/anode/PEM/cathode/second FTL is referred to as a membrane electrode assembly (MEA).

The FTLs are typically fabricated from a carbon fiber paper or non-woven material. Depending on the product construction, the FTLs can have carbon particle coatings on one side. The FTLs, as discussed above, can be fabricated to include or exclude a catalyst coating. The FTLs, according to this product construction, are both porous and brittle. An MEA/bonding fixture separation apparatus consistent with the principles of the present invention is particularly well suited for safely separating bonded MEAs from their bonding fixtures while maintaining proper MEA orientation required for downstream processing during automated fuel cell assembly.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120–190 degrees F.

Molten carbonate fuel cells (MCFC) use a liquid solution of lithium, sodium and/or potassium carbonates, soaked in a matrix for an electrolyte. MCFCs operate at about 1,200 degrees F. The high operating temperature is needed to achieve sufficient conductivity of the electrolyte. Because of this high temperature, noble metal catalysts are not required for the cell's electrochemical oxidation and reduction processes. MCFCs are typically operated on hydrogen, carbon monoxide, natural gas, propane, landfill gas, marine diesel, and simulated coal gasification products.

A solid oxide fuel cell (SOFC) typically employs a hard ceramic material of solid zirconium oxide and a small amount of ytrria, instead of a liquid electrolyte, allowing operating temperatures to reach 1,800 degrees F.

In regenerative fuel cells, water is separated into hydrogen and oxygen by a solar-powered electrolyser. The hydrogen and oxygen are fed into the regenerative fuel cell which generates electricity, heat, and water. The water is then recirculated back to the solar-powered electrolyser and the process is repeated.

A protonic ceramic fuel cell (PCFC) employs a ceramic electrolyte material that exhibits high protonic conductivity at elevated temperatures. PCFCs operate at about 1,300 degrees F. PCFCs can operate at high temperatures and electrochemically oxidize fossil fuels directly to the anode. Gaseous molecules of the hydrocarbon fuel are absorbed on the surface of the anode in the presence of water vapor, and hydrogen ions are efficiently stripped off to be absorbed into the electrolyte, with carbon dioxide as the primary reaction product. These and other fuel cell technologies can be bonded or cured within a fixture pallet assembly and subject to separation from the fixture pallet assembly following a bonding/cure cycle by use of a separation apparatus of the present invention.

Figure 2:
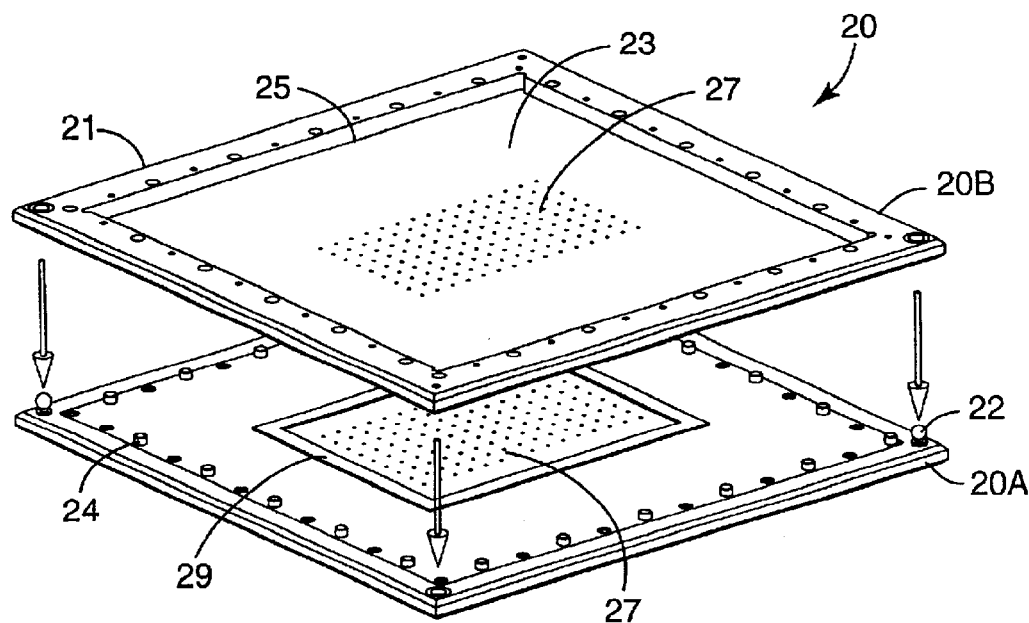
FIG. 2 illustrates a two-part fixture pallet assembly well suited for facilitating automated stacking and bonding of fuel cell layers in accordance with an embodiment of the present invention.

With reference to FIG. 2, there is illustrated a transportable fixture pallet assembly 20 which can be used in conjunction with a separation apparatus in accordance with an embodiment of the present invention. The fixture pallet assembly 20 is preferably used to facilitate automated stacking, transporting, and bonding of porous and non-porous material layers, such as porous and non-porous fuel cell layers. The fixture pallet assembly 20 advantageously provides a structure within which a multiplicity of porous and non-porous material layers can be stacked and positional alignment of the layers can be maintained during construction, bonding, and trimming of the stack.

In addition, the fixture pallet assembly 20 provides a structure for transporting a stack of material layers from one processing station to various other processing stations, such as a bonding station, while maintaining positional alignment of the layers during transport and subsequent processing. For example, once the material layers of a stack are positioned within the fixture pallet assembly 20, the alignment of the stack within the fixture pallet assembly 20 is fixed and known. As such, the fixture pallet assembly 20 need only be properly aligned at a downstream processing station, such as a bonding station, to ensure that the stack contained therein is in proper alignment for processing at the downstream processing station.

According to the embodiment shown in FIG. 2, the fixture pallet assembly 20 is a two-part assembly. The fixture pallet assembly 20 is shown to include a first fixture 20A and a second fixture 20B. The first and second fixtures 20A, 20B each include a frame 21 and a plate 23 situated within a cutout portion 25 of the frame 21. Screws 24 are used to mount the plate 23 to the frame 21. It is understood that other means of fastening the plate 23 to the frame 21 may be employed.

The cutout portion 25 of the frame 21 within which the plate 23 is positioned is preferably configured to allow a bonding press to directly contact the plate 23. This direct contact arrangement provides for efficient transfer of heat from the bonding press to the stack of material layers positioned within the fixture pallet assembly 20 during a bonding operation.

The plate 23 includes at least one substantially porous region 27. The porous region 27 may define a depression or recess 28 relative to the plane of the plate 23. The porous region 27 is depicted in FIG. 2 as a pattern of apertures provided in the plate 23. The porous region 27 permits air to flow freely through the plate 23 and allows for the production and removal of a vacuum during use of the fixture pallet assembly 20.

For example, a vacuum produced on one side of the porous region 27 provides for releasable engagement of a porous material layer, non-porous material layer or combination of porous and non-porous material layers situated proximate the other side of the porous region 27. Further, the porous region 27 is preferably configured to permit both the fixture, such as the first fixture 20A, and a porous and/or non-porous material layer situated proximate the other side of the porous region 27 to be moved as a unit via a vacuum and a gripper mechanism. As is illustrated, a porous region 27 is preferably provided on the plate 23 of each of the first and second fixtures 20A, 20B.

The porous region 27 of the plate 23 is adapted to receive one or more material layers and to facilitate formation of a vacuum between the plate 23 and the material layers(s) residing within porous region 27. As such, the size and shape of the porous region 27 is designed to accommodate the size and shape of the material layers to be stacked, transported, and bonded within the fixture pallet assembly 20.

The fixture pallet assembly 20 preferably incorporates an alignment arrangement that provides for registration of the first fixture 20A relative to the second fixture 20B when the first and second fixtures 20A, 20B are brought into contact under pressure. The alignment arrangement can include one or more alignment features situated on the first and second fixtures 20A, 20B.

The fixture pallet assembly 20 can also include an alignment arrangement to allow for accurate positioning of the fixture pallet assembly 20 at various processing stations, such as when the fixture pallet assembly 20 is moved from a stacking station to a bonding station, and from the bonding station to a cutting station, for example. As such, the fixture pallet assembly 20 need only be properly aligned at each processing station to ensure that the stack contained within the fixture pallet assembly 20 is in proper alignment for processing at the particular station, it being understood that processing at the particular station does not adversely disrupt the alignment of the stack. Additional features of the fixture pallet assembly 20 are described in commonly owned copending application entitled "FIXTURE PALLET APPARATUS FOR AUTOMATED ASSEMBLY OF FUEL CELL MATERIAL LAYERS," filed concurrently herewith under Attorney Docket No. 57422US002, which is hereby incorporated herein by reference.

Figure 3:
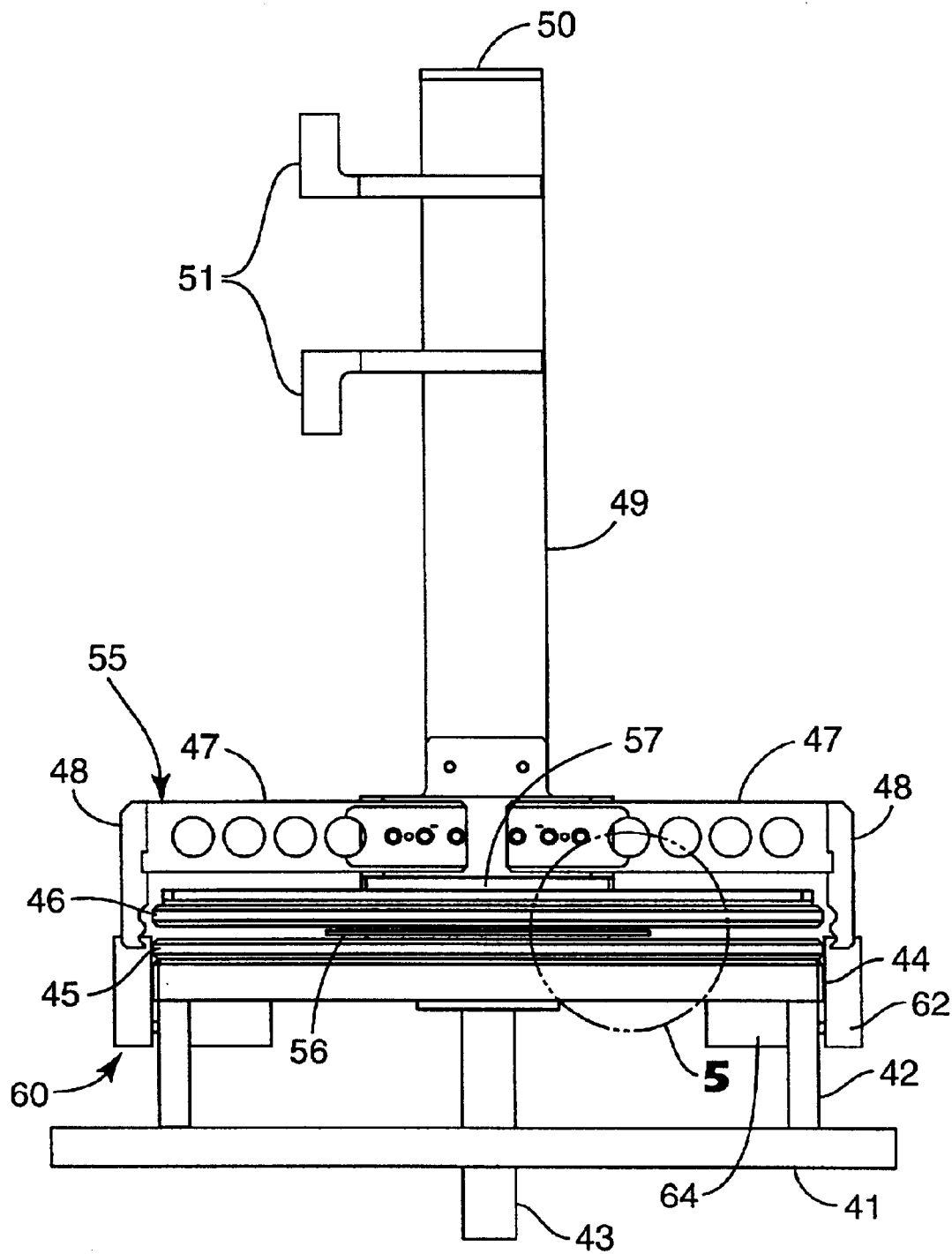
FIG. 3 is an illustration of a separation apparatus that separates a membrane electrode assembly from a bonding fixture in accordance with an embodiment of the present invention, the separation apparatus shown in an orientation prior to performing MEA/bonding fixture separation.
Figure 4:
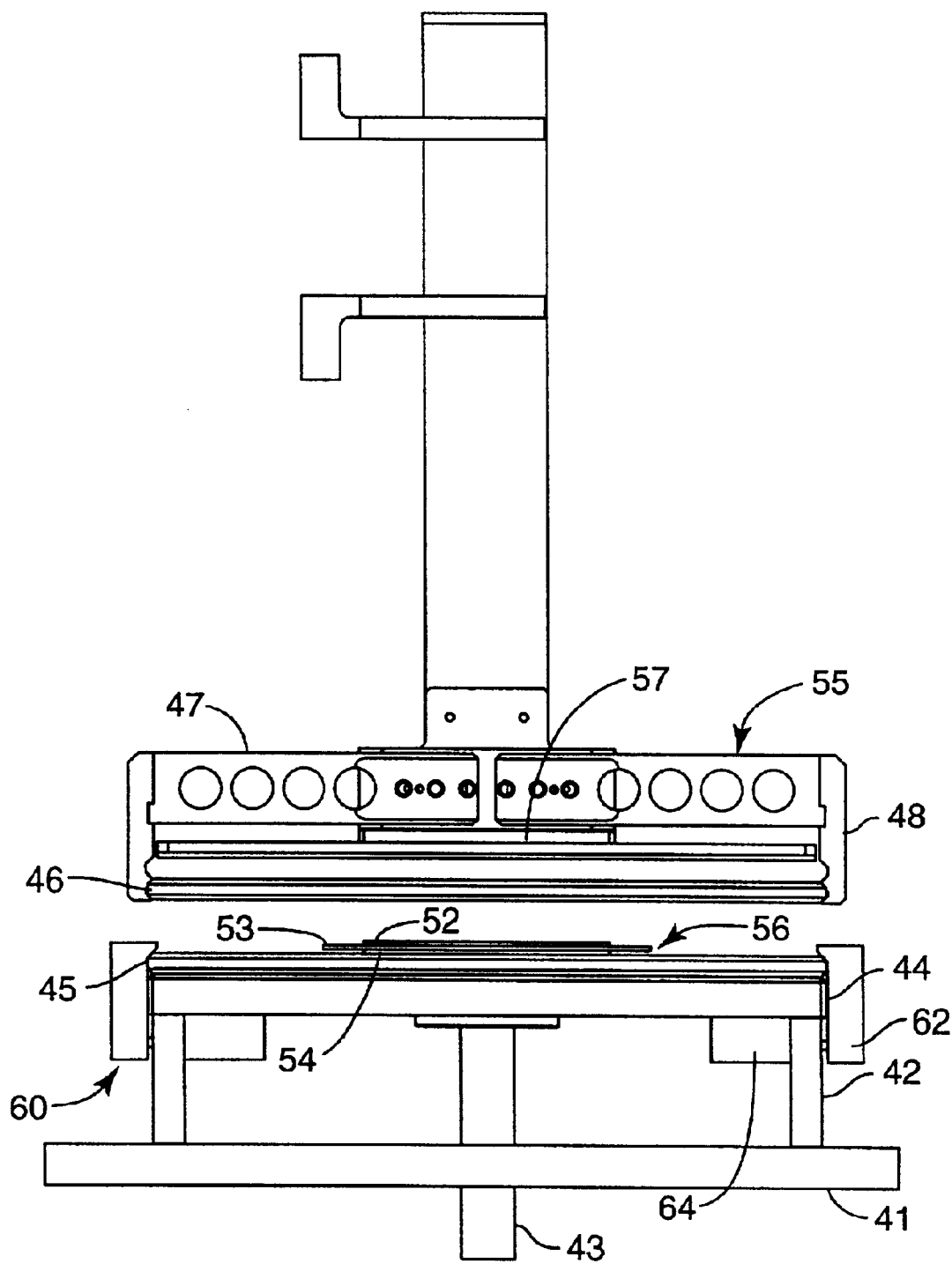
FIG. 4 is an illustration of the separation apparatus of FIG. 3 shown in an orientation subsequent to performing MEA/bonding fixture separation.
Figure 5:
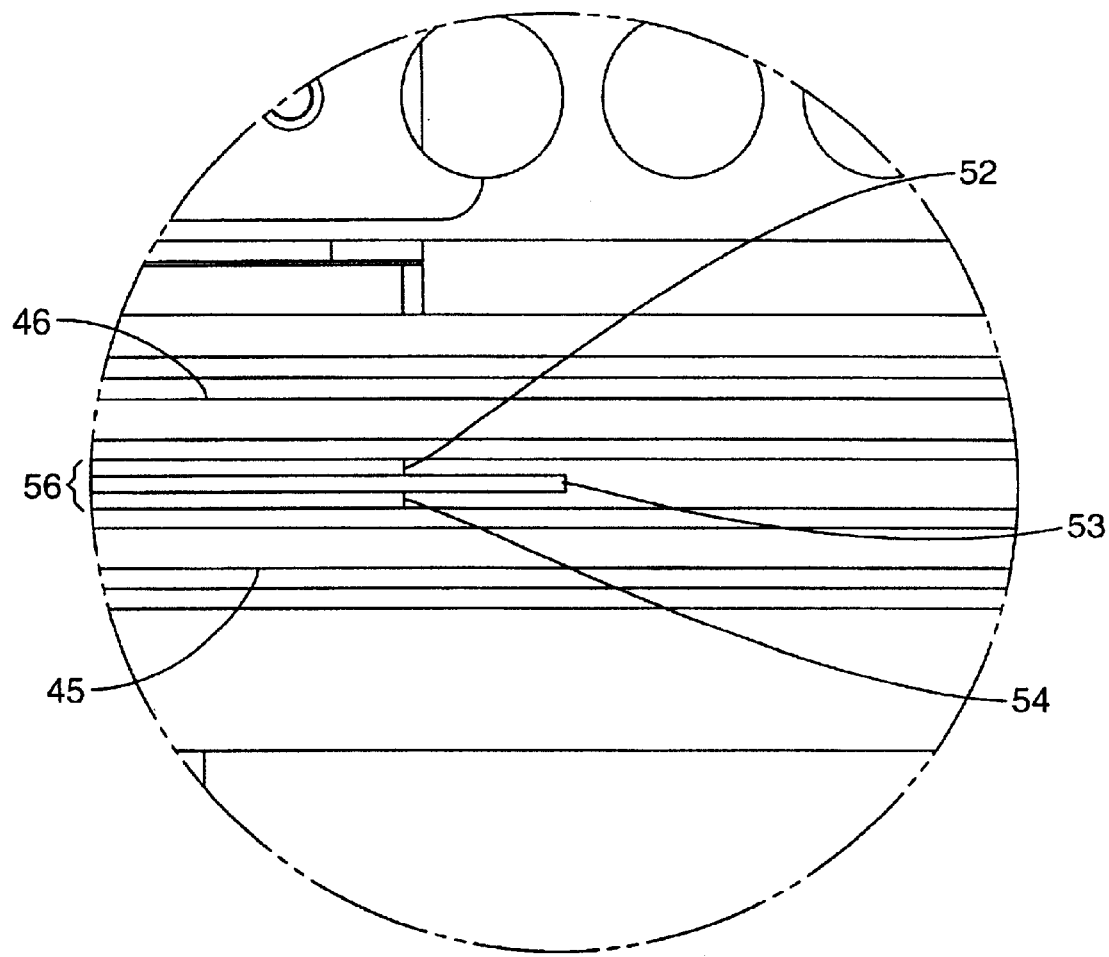
FIG. 5 is an exploded view of region A shown in FIG. 3, region A showing various layers of an MEA and the MEA constrained between two halves of a bonding fixture.

Turning now to FIGS. 3 and 4, there is illustrated a separation apparatus that separates a membrane electrode assembly from a fixture pallet assembly or other bonding fixture in accordance with an embodiment of the present invention. FIG. 3 is an illustration of the separation apparatus in an orientation prior to performing MEA/bonding. FIG. 4 is an illustration of the separation apparatus of FIG. 3 shown in an orientation subsequent to performing MEA/bonding. For purposes of the following discussion, and in general terms, an MEA 56 can be defined as a five layer fuel cell construct defined by a first fluid transport layer (FTL)/anode/membrane/cathode/second FTL. The MEA 56 is depicted in FIGS. 3–5 as a three layer structure, in which the anode and cathode layers are present but not shown. The MEA 56 is shown to include a first fluid transport layer 54, a second fluid transport layer 52, and a membrane layer 53 situated between the first and second transport layers 54, 52.

The separation apparatus shown in FIGS. 3 and 4 includes a horizontal support 41 and two or more vertical supports 42. A base 44 is shown supported by the vertical supports 42. The base 44 includes a first port 43 which can be connected to a vacuum/pressurization system (not shown). When connected to the vacuum/pressurization system, the first port 43 can be selectively pressurized or evacuated to produce a vacuum. A controllable valve in line with the vacuum/pressurization system and first port 43 can be controlled to pressurize, evacuate or normalize the first port 43 with respect to ambient pressure.

The base 44 is adapted to receive a first fixture 45 of a two-part fixture pallet assembly. The first port 43 is in fluid communication with a first surface of the MEA 56 via the porous region of the first fixture 45. The base 44 further comprises a lower gripper assembly 60 which includes a pair of lower gripper actuators 64 and lower grippers 62. Each lower gripper actuator 64 is controllable to cause a respective lower gripper 62 to engage and disengage with an edge of the first fixture 45. The lower gripper assembly 60 is adapted to grip a pair of opposing edges of the first fixture 45 in order to stabilize the first fixture 45 to the base 44 during the separation process.

The separation apparatus further includes an upper gripper assembly 55. The upper gripper assembly 55 is mounted for bi-directional vertical movement on a support 49. The upper gripper assembly 55 includes a pair of gripper arms 47. Each of the gripper arms 47 includes gripper fingers 48 which are adapted to controllably and releasably grip a pair of opposing edges of the second fixture 46. Movement of the gripper fingers 48 and lower grippers 62 of the upper and lower gripper assemblies 55 and 60, respectively, is controlled by use of pneumatics.

The upper gripper mechanism 55 includes a second port 57. The second port 57 can be connected to a vacuum/pressurization system (not shown). When connected to the vacuum/pressurization system via piping unit 50, the second port 57 can be selectively pressurized or evacuated to produce a vacuum. A controllable valve in line with the vacuum/pressurization system and second port 57 can be controlled to pressurize, evacuate or normalize the second port 57 with respect to ambient pressure.

The second port 57 is in fluid communication with a second surface of the MEA 56 via the porous region of the second fixture 46. The first and second ports 43, 57 can be selectively pressurized and evacuated to facilitate separation of the first and second surfaces of the MEA 56 from the first and second fixtures 45 and 46, respectively. The upper gripper assembly 55 is adapted to releasably grip a pair of opposing edges of the second fixture 46 and to move the second fixture 46 out of proximity with the first fixture 45.

Movement of the upper gripper assembly 55, according to one embodiment, is controlled by a ballscrew assembly (not shown) coupled to the gripper assembly 55 via mounting arms 51. The ballscrew assembly controllably moves the upper gripper assembly 55 bi-directionally along support 49.

According to one methodology of the present invention, a separation apparatus of the present invention separates an MEA 56 from a fixture assembly subsequent to MEA bonding within the fixture assembly. As is shown in FIG. 5, the fixture assembly includes a first fixture 45 contacting a first surface of the MEA 56 and a second fixture 46 contacting a second surface of the MEA 56. As discussed previously, the first and second fixtures 45, 46 each comprise a substantially porous region. The separation apparatus is controlled to perform the following automated operations in accordance with one separation methodology.

The first fixture 45 is stabilized on the base 44, typically by use of the lower gripper assembly (not shown). The second fixture 46 is stabilized by a vacuum produced at the second port 57 of the upper gripper assembly 55. While the second fixture 46 is stabilized, the first fixture 45 is pressurized via the first port 43 in order to cause the first surface of the MEA 56 to separate from the first fixture 45. In a configuration in which a gasket is formed around the MEA 56 during bonding, pressurizing the first fixture 45 works to separate a first surface of the gasket from the first fixture 45.

Pressurizing the first fixture 45 preferably involves permitting a small amount of compliant movement between the second fixture 46 and the first fixture 45 to facilitate separation between the first surface of the MEA 56 and the first fixture 45. This compliant movement typically involves movement of less than about 0.08 inches between the second fixture 46 and the first fixture 45. The second fixture 46 is stabilized by use of a vacuum formed at the second port 57 while compliant movement between the second fixture 46 and the first fixture 45 is permitted.

While the first fixture 45 is stabilized, the second fixture 46 is pressurized to cause the second surface of the MEA 56 to separate from the second fixture 46. In a configuration in which a gasket is formed around the MEA 56 during bonding, pressurizing the second fixture 46 works to separate a second surface of the gasket from the second fixture 46.

Pressurizing the second fixture 46 involves permitting compliant movement, preferably less than about 0.08 inches, between the second fixture 46 and the first fixture 45 to facilitate separation between the second surface of the MEA 56 and the second fixture 46. The second fixture 46 is stabilized by use of a vacuum while permitting compliant movement between the second fixture 46 and the first fixture 45. The first and second fixtures 45, 46 are selectively pressurized to between about 1 psi and about 15 psi.

According to one particular separation methodology, a vacuum produced at the second port 57 of the upper gripper assembly 55 is applied to the second fixture 46 and the second surface of the MEA 56 while pressure is being applied to the first fixture 45 and the first surface of the MEA 56 via the first port 43 of the base 44. Subsequently, a vacuum produced at the first port 43 is applied to the first fixture 45 and the first surface of the MEA 56 while pressure is being applied to the second fixture 46 and the second surface of the MEA 56 via the second port 57.

After the MEA 56 is separated from the first and second fixtures 45, 46, the second fixture 46 is moved out of proximity with the first fixture 45 to permit removal of the MEA 56 from the first fixture 45. The first fixture 45 is stabilized using a vacuum or the lower gripper assembly when the second fixture 46 is moved out of proximity with the first fixture 45.

The various stabilization steps described in the preceding illustrative separation methodology ensures that the MEA 56, when separated from the first and second fixtures 45, 46, is in the proper position for subsequent processing of the MEA 56. For example, the MEA 56, once freed from the fixture assembly, can be transported by a robot from the bonding station to a cutting station, the robot careful to transport the freed MEA 56 in the same orientation from the bonding station to the cutting station.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of separating a membrane electrode assembly (MEA) from a fixture assembly subsequent to MEA bonding within the fixture assembly, the fixture assembly comprising a first fixture contacting a first surface of the MEA and a second fixture contacting a second surface of the MEA, the first and second fixtures comprising substantially porous regions, respectively, the method comprising:
    stabilizing the first fixture of the fixture assembly;
    stabilizing the second fixture of the fixture assembly;
    while the second fixture is stabilized, pressurizing the first fixture to cause the first surface of the MEA to separate from the first fixture;
    while the first fixture is stabilized, pressurizing the second fixture to cause the second surface of the MEA to separate from the second fixture; and
    moving the second fixture out of proximity with the first fixture to permit removal of the MEA from the first fixture.

2. The method of claim 1, wherein vacuum is applied to the second fixture and second surface of the MEA while pressure is being applied to the first fixture and first surface of the MEA, and, subsequently, vacuum is applied to the first fixture and first surface of the MEA while pressure is being applied to the second fixture and second surface of the MEA.

3. The method of claim 1, wherein stabilizing the first fixture comprises gripping the first fixture so as to stabilize the first fixture.

4. The method of claim 1, wherein stabilizing the second fixture comprises using a vacuum to stabilize the second fixture.

5. The method of claim 4, wherein stabilizing the second fixture comprises using a vacuum formed between the second fixture and a movable structure proximate the second fixture to stabilize the second fixture.

6. The method of claim 1, wherein pressurizing the first fixture further comprises permitting compliant movement between the second fixture and the first fixture to facilitate separation between the first surface of the MEA and the first fixture.

7. The method of claim 6, wherein permitting compliant movement comprises permitting movement of less than about 0.08 inches between the second fixture and the first fixture.

8. The method of claim 6, wherein the second fixture is stabilized by use of a vacuum while permitting compliant movement between the second fixture and the first fixture.

9. The method of claim 1, wherein pressurizing the second fixture further comprises permitting compliant movement between the second fixture and the first fixture to facilitate separation between the second surface of the MEA and the second fixture.

10. The method of claim 9, wherein permitting compliant movement comprises permitting movement of less than about 0.08 inches between the second fixture and the first fixture.

11. The method of claim 8, wherein the second fixture is stabilized by use of a vacuum while permitting compliant movement between the second fixture and the first fixture.

12. The method of claim 1, wherein moving the second fixture comprises stabilizing the first fixture using a vacuum when moving the second fixture out of proximity with the first fixture.

13. The method of claim 1, wherein moving the second fixture comprises gripping the second fixture and vertically displacing the gripped second fixture out of proximity with the first fixture.

14. The method of claim 1, wherein the first and second fixtures are selectively pressurized to between about 1 psi and about 15 psi.

15. An apparatus for separating a membrane electrode assembly (MEA) from a fixture assembly subsequent to MEA bonding within the fixture assembly, the fixture assembly comprising a first fixture contacting a first surface of the MEA and a second fixture contacting a second surface of the MEA, the first and second fixtures comprising substantially porous regions, respectively, the apparatus comprising:
    a base comprising a first port and adapted to receive the fixture assembly such that the first port is in fluid communication with a first surface of the MEA via the porous region of the first fixture; and
    a gripper assembly mounted for movement on a support and comprising a gripper mechanism and a second port, the second port in fluid communication with a second surface of the MEA via the porous region of the second fixture, the first and second ports selectively pressurized and evacuated to separate the first and second surfaces of the MEA from the first and second fixtures, respectively, the gripper assembly adapted to releasably grip a pair of opposing edges of the second fixture and to move the second fixture out of proximity with the first fixture.

16. The apparatus of claim 15, wherein the base further comprises a gripper assembly, the gripper assembly of the base adapted to grip a pair of opposing edges of the first fixture to stabilize the first fixture to the base.

17. The apparatus of claim 15, further comprising a first valve and a second valve, the first valve controllable for pressurizing and evacuating the first port, and the second valve controllable for pressurizing and evacuating the second port.

18. The apparatus of claim 15, further comprising a ballscrew assembly coupled to the gripper assembly, the ballscrew assembly controllably moving the gripper assembly relative to the support.

19. The apparatus of claim 15, wherein the gripper assembly comprises a pair of gripper arms, each of the gripper arms comprising a gripper finger, the gripper fingers adapted to releasably grip the pair of opposing edges of the second fixture.

20. The apparatus of claim 15, wherein a vacuum is formed between the second port and the second fixture to selectively stabilize the second fixture.

21. The apparatus of claim 15, wherein the gripper assembly is moveable during pressurization of the first port to permit compliant movement between the second fixture and the first fixture to facilitate separation between the first surface of the MEA and the first fixture.

22. The apparatus of claim 21, wherein the gripper assembly is moveable to permit compliant movement of less than about 0.08 inches between the second fixture and the first fixture.

23. The apparatus of claim 21, wherein the second port is evacuated to form a vacuum between the second port and the second fixture, the vacuum stabilizing the second fixture in the presence of movement between the second fixture and the first fixture.

24. The apparatus of claim 15, wherein the gripper assembly is moveable during pressurization of the second port to permit compliant movement between the second fixture and the first fixture to facilitate separation between the second surface of the MEA and the second fixture.

25. The apparatus of claim 24, wherein the gripper assembly is moveable to permit compliant movement of less than about 0.08 inches between the second fixture and the first fixture.

26. The apparatus of claim 24, wherein the second port is evacuated to form a vacuum between the second port and the second fixture, the vacuum stabilizing the second fixture in the presence of movement between the second fixture and the first fixture.

27. The apparatus of claim 15, wherein the first port is evacuated to form a vacuum between the first port and the first fixture for stabilizing the first fixture when the gripper assembly moves the second fixture out of proximity with the first fixture.

28. The apparatus of claim 15, wherein the gripper assembly is controllably displaced vertically relative to the base when the gripper assembly moves the second fixture out of proximity with the first fixture.

29. The apparatus of claim 15, wherein a vacuum is applied to the second fixture and second surface of the MEA while pressure is being applied to the first fixture and first surface of the MEA, and, subsequently, vacuum is applied to the first fixture and first surface of the MEA while pressure is being applied to the second fixture and second surface of the MEA.

30. The apparatus of claim 15, wherein the first and second ports are selectively pressurized to between about 1 psi and about 15 psi.

* * * * *